United States Patent [19]

Allison, Jr.

[11] Patent Number: 4,737,066
[45] Date of Patent: Apr. 12, 1988

[54] WHEEL LIFT FOR VEHICLE TOWING

[76] Inventor: James C. Allison, Jr., 5257 Summergate Dr., Matthews, N.C. 28105

[21] Appl. No.: 24,574

[22] Filed: Mar. 11, 1987

[51] Int. Cl.⁴ .............................................. B60P 3/12
[52] U.S. Cl. ..................................... 414/563; 280/402
[58] Field of Search ........................ 414/563; 280/402

[56] References Cited

U.S. PATENT DOCUMENTS

| | | | |
|---|---|---|---|
| 1,851,349 | 3/1932 | Cowles | 414/563 X |
| 2,481,223 | 9/1949 | Johnson | 414/563 |
| 2,495,493 | 1/1950 | Wright | 414/563 X |
| 3,951,280 | 4/1976 | Peck | 414/563 |
| 4,000,823 | 1/1977 | Aquila | 280/402 X |
| 4,264,262 | 4/1981 | LoCodo | 280/402 X |
| 4,473,237 | 9/1984 | Lind | 414/563 X |
| 4,534,579 | 8/1985 | Shackelford, Sr. | 414/563 X |
| 4,557,496 | 12/1985 | Sill | 280/402 |
| 4,632,629 | 12/1986 | Kooima | 414/563 |
| 4,634,337 | 1/1987 | hamman | 414/563 |
| 4,637,623 | 1/1987 | Bubik | 414/563 X |
| 4,640,660 | 2/1987 | Watson | 414/563 |
| 4,678,392 | 7/1987 | Capers et al. | 414/563 |
| 4,679,978 | 7/1987 | Holmes et al. | 414/563 |

Primary Examiner—Joseph E. Valenza
Assistant Examiner—David A. Bucci
Attorney, Agent, or Firm—Bell, Seltzer, Park & Gibson

[57] ABSTRACT

A vehicle towing apparatus is disclosed, and wherein a frame assembly adapted to be fixed to a truck chassis includes a first pair of linear and transversely opposed guide channels and a separate second pair of linear and transversely opposed guide channels and wherein the second pair of guide channels are inclined more closely to the vertical than the first pair of guide channels when viewed in a side elevation. A foot assembly is also provided which comprises a longitudinally extending beam, with a forward end and rear end, and which has a wheel engaging device mounted too the rear end. A support beam is fixed to the longitudinal beam and extends upwardly and has a first pair of rollers which operatively engages the first pair of opposed guide channels and a second pair of rollers which operatively engages the second pair of guide channels. A drive device is connected between the frame assembly and the support beam for selectively moving the support along the guide channels in order to lower and raise the foot assembly and correspondingly lower and raise a vehicle secured to the wheel engaging device.

9 Claims, 4 Drawing Sheets

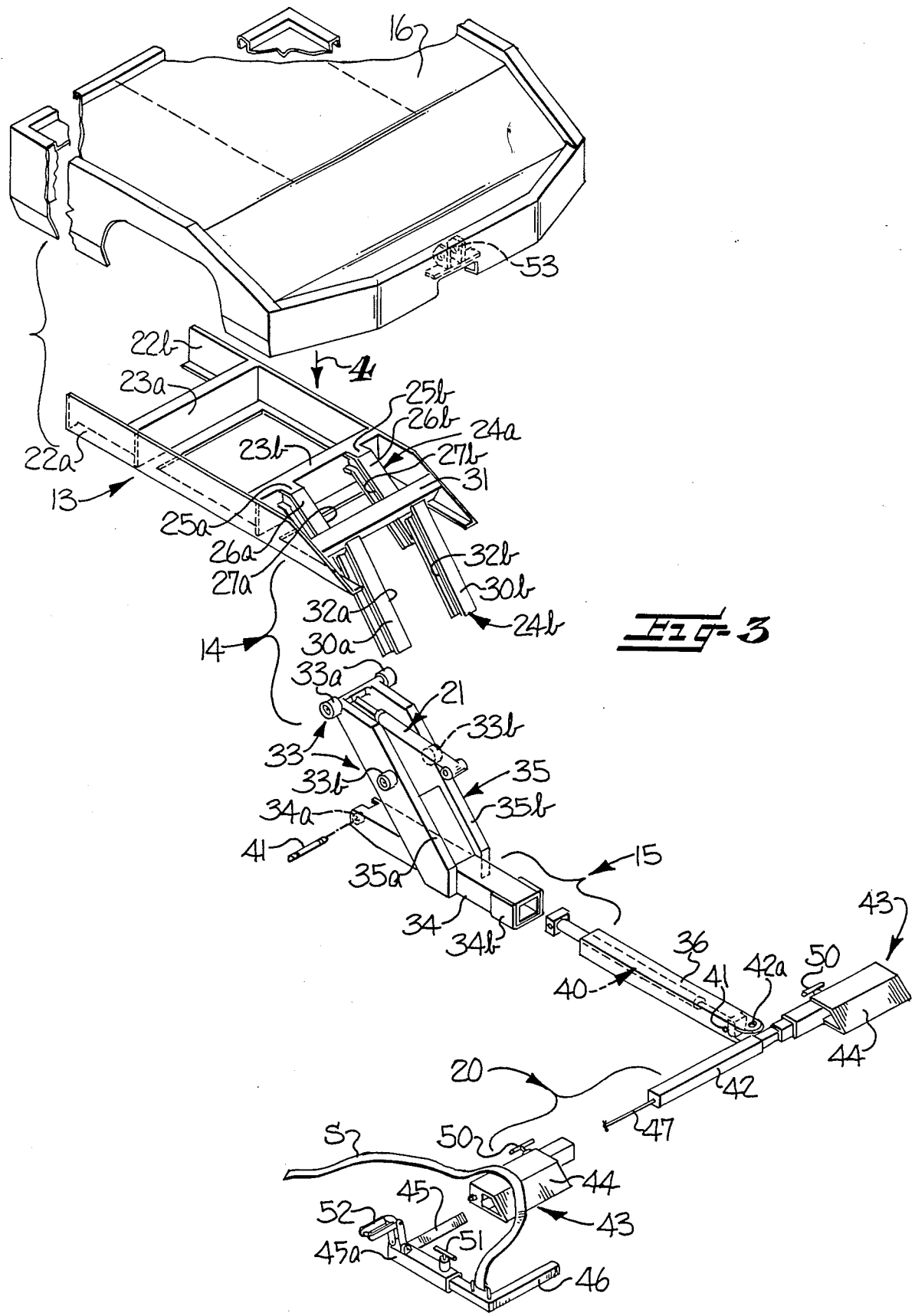

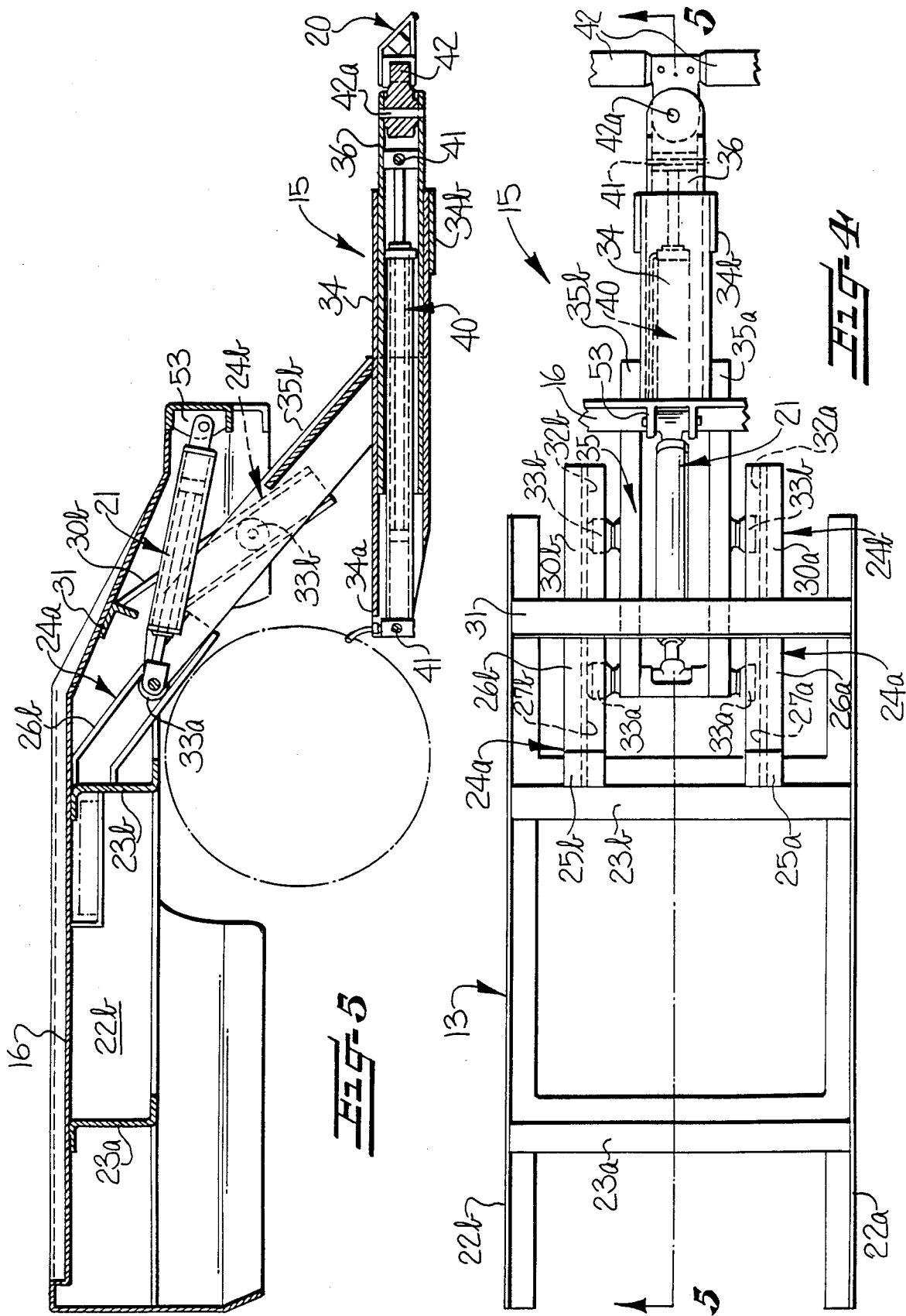

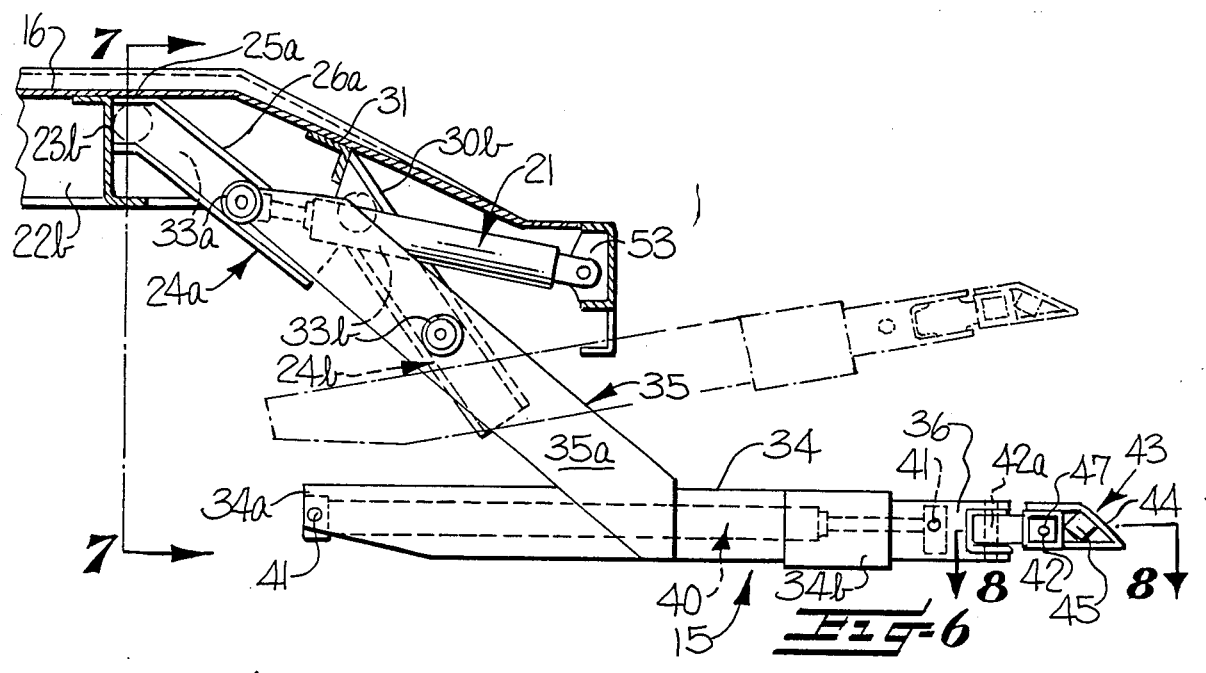
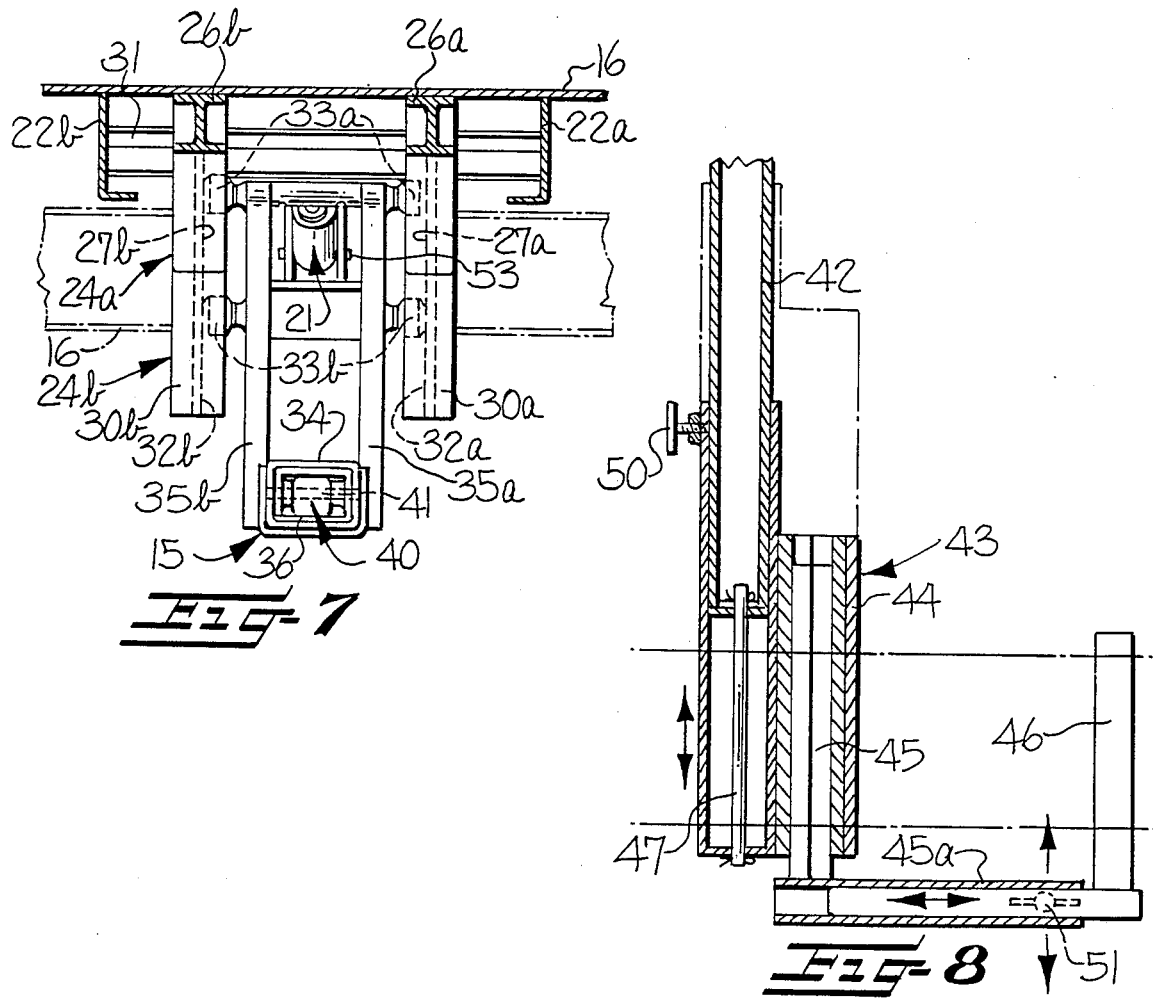

4,737,066

WHEEL LIFT FOR VEHICLE TOWING

BACKGROUND OF THE INVENTION

The present invention relates to an apparatus for towing vehicles and more particularly to an apparatus used with trucks and the like to provide an efficient means to tow a vehicle.

The first tow trucks had a large crane or boom arm mounted in the bed of a truck and used a hoist mechanism comprising various types of sling and chain arrangements associated with the arm which lifted one end of the disabled vehicle. For older styled and manufactured vehicles which used heavy gauge steel on bumpers, frame assemblies, and vehicle bodies, a crane arm and sling arrangement was satisfactory since the bumpers, frames and bodies of these older vehicles were strong enough to support a vehicle while it was being towed without causing appreciable damage to the vehicle. However, in recent years, car manufacturers have utilized lighter gauge steels and synthetic materials for bumpers, frames and bodies of various vehicles in order to lower manufacturing costs, raise fuel efficiency and provide shock-collapsible bumpers. These lighter gauge steels and synthetic materials markedly reduced the vehicle strength with the result that whenever one of these vehicles was towed with a conventional crane arm and sling arrangement, the vehicles were damaged at the bumpers, frames or even on the bodies near the fenders.

As a result of the above problems, manufacturers have recently redesigned tow trucks and associated apparatus used to tow vehicles so that instead of towing a vehicle by its frame and bumper, the vehicle is towed by its wheels. This has been accomplished through the use of wheel lifts comprising a suitable wheel engaging member which attaches to the front or rear of the wheels, and a suitable telescoping foot assembly which telescopes the wheel engaging member and also provides the lift to the wheel engaging member. While lifting the wheel engaging member, it is important to change the lift angle of the foot assembly from the horizontal when it is in its lowered position to an inclined position where the wheel engaging member is above the other end of the foot assembly in order to leave clearance between the foot assembly and the bumpers and flashings of those vehicles that are low-lying to the ground. Heretofore, prior art systems have used numerous moving parts with various pivoting points to change the lift angle of the foot assembly as it lifts the wheel engaging member and the secured vehicle. The complexity of such systems which use so many moving parts and pivot points creates problems of increased wear and maintenance periods and reduces overall efficiency while adding to the higher costs of manufacture.

It is accordingly an object of the present invention to provide an apparatus for towing vehicles and which overcomes the above noted deficiencies of the prior art.

It is a particular object of the present invention to provide an apparatus for towing vehicles which is readily adapted to be mounted to a truck chassis.

It is a more particular object of the present invention to provide an apparatus for towing vehicles which is of simple constructional design, and wherein the lifting mechanism automatically changes the angle of lift.

SUMMARY OF THE INVENTION

In accordance with the present invention, these and other objects and advantages are achieved, by the provision of an apparatus which comprises a frame assembly which is adapted to be mounted to a truck chassis and so as to define a longitudinal direction along the truck length and also a side to side transverse direction. The frame assembly includes guide channel means which have longitudinally spaced apart forward and rear segments. When viewed in side elevation, the rear segment is upwardly inclined more closely to the vertical than is the forward segment. The apparatus also includes a foot assembly which includes a longitudinally extending beam which has a forward end and a rear end, and an upwardly extending support beam fixed to the longitudinal beam. A wheel engaging means is mounted at the rear end of the longitudinal beam for engaging either the front or rear wheels of a vehicle to be towed. Roller means are mounted at two spaced apart locations along the length of the support beam of the foot assembly for slidably mounting the foot assembly to the guide channel means and for slidably moving the support beam between a lowered position, wherein the longitudinal beam is generally horizontal, and a raised position wherein the longitudinal beam is inclined with respect to the horizontal and the longitudinal beam rear end is above the forward end. A drive means is connected between the frame assembly and the foot assembly which selectively moves the foot assembly along the guide channel means and between the lowered and raised positions. Thus, when the foot assembly is in its lowered position, the wheel engaging means is adapted to engage either the front or rear wheels of a vehicle to be towed. The foot assembly is then moved to its raised position to lift the front or rear wheels and thus one end of the vehicle so as to enable the vehicle to be towed.

In the preferred embodiment, the forward segment of the guide channel means comprises a first pair of linear and transversely opposed channels, and the rear segment comprises a second pair of linear and transversely opposed channels separate from the forward segment's opposed channels. The roller means includes a first pair of rollers which operatively engages the opposed channels of the forward segment and a second pair of rollers which operatively engages the opposed channels of the rear segment. Thus, during operation, the foot assembly support beam may slidably roll up and down along the opposed channels through the action of the drive means thus lowering and raising the wheel engaging means.

BRIEF DESCRIPTION OF THE DRAWINGS

Some of the objects and advantages of the present invention having been stated, others will become apparent by reference to the following drawings, in which

FIG. 3 is an exploded isometric view illustrating the structural relationship among the deck, frame assembly, guide channel means, roller means and foot assembly.

FIG. 4 is a plan view of the frame and foot assembly taken in the direction of arrow 4 of FIG. 3.

FIG. 5 is a sectional view of the deck, frame, guide channel means and foot assembly taken along the line 5—5 of FIG. 4.

FIG. 6 is a side sectional view of the frame, guide channel means, foot assembly and drive means and illustrating the foot assembly in both raised and lowered positions.

FIG. 7 is an end sectional view taken along the line 7—7 of FIG. 6.

FIG. 8 is a plan sectional view of the cross arm and the lift arms taken along the line 8—8 of FIG. 6.

DESCRIPTION OF ILLUSTRATED EMBODIMENT

Figure 1:
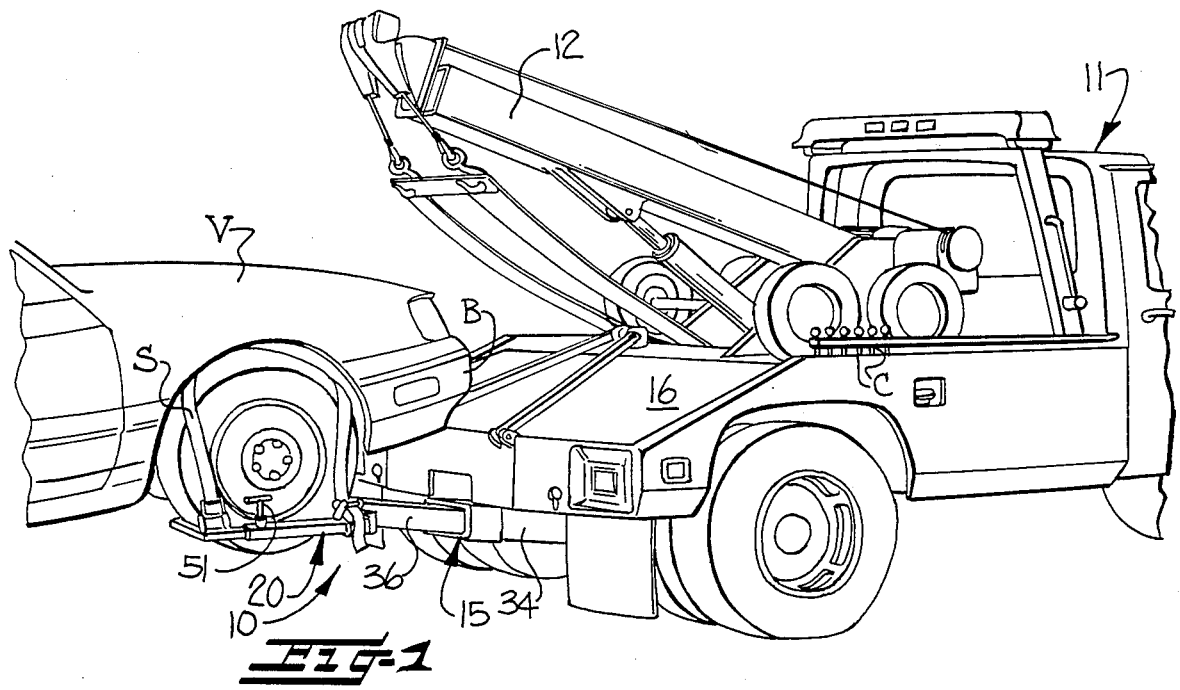
FIG. 1 is a perspective view of the present invention secured onto a conventional truck chassis and illustrating the relevant positions of the truck and a towed vehicle.

Referring now more particularly to the drawings, there is illustrated in FIG. 1 a vehicle towing apparatus 10 attached to a conventional truck 11 and towing a disabled vehicle V. Positioned on top of the apparatus 10 is a conventional crane arm and sling arrangement 12 used with the majority of tow trucks so as to provide a means to pull disabled vehicles from ditches and other areas where a vehicle may have become entrapped.

Figure 2:
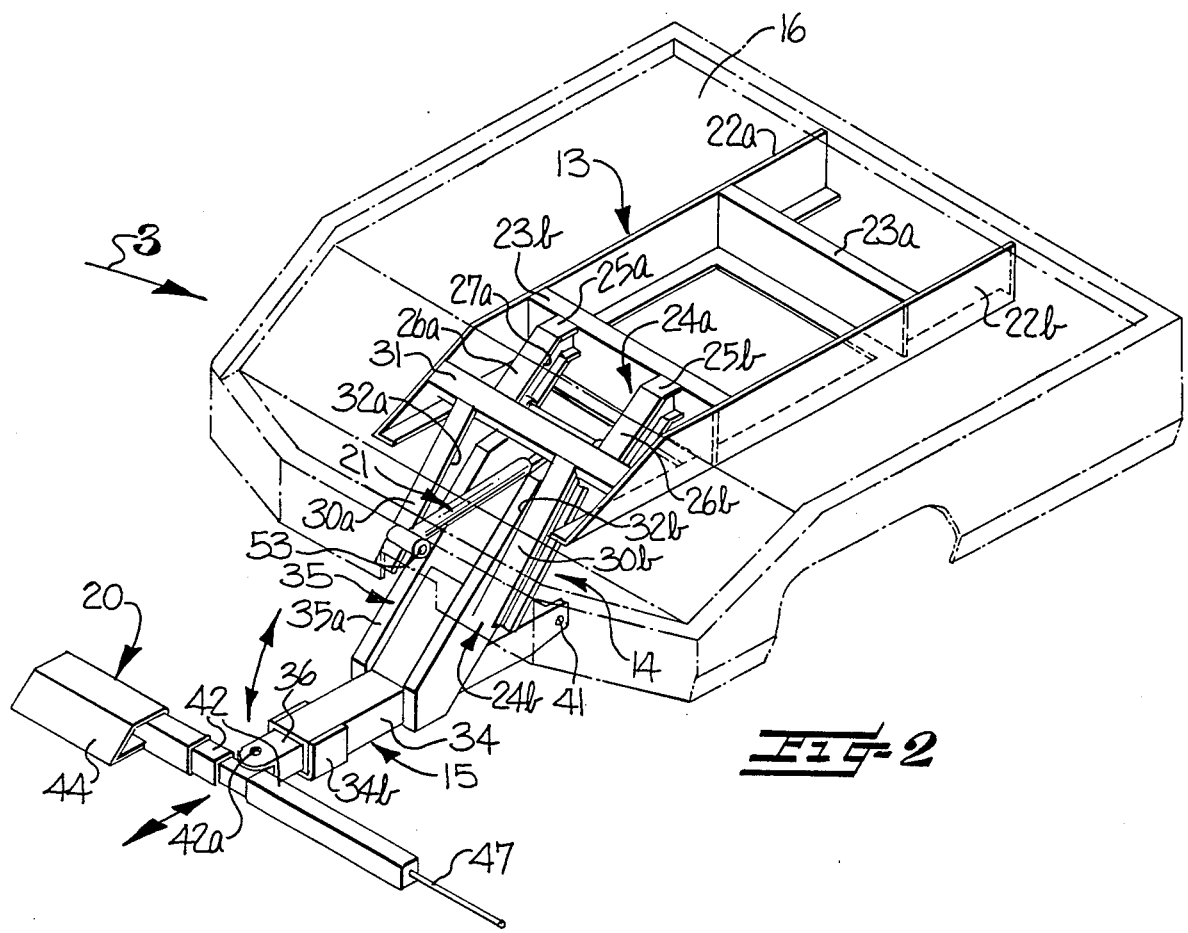
FIG. 2 is a perspective view in partial cutaway showing the positioning of the guide channel means and foot assembly relative to the frame assembly and deck.

Referring now to FIG. 2, the apparatus 10 includes a frame assembly 13 which is adapted to be mounted to a standard truck 11. The frame assembly 13 includes an inclined guide channel means 14 which allows a foot assembly 15 having a wheel engaging means 20 for engaging either the front or rear wheels of a disabled vehicle V, to slidably move along the inclined guide channel means 14 through the directed force of a drive means 21 connected between the frame assembly 13 and the foot assembly 15 and thus lift a disabled vehicle V by its wheels which are secured to the wheel engaging means 20. A deck 16 is fixedly mounted on top of the frame 13 to provide a flat surface and support for the crane arm and sling arrangement 12 and to protectively cover the frame assembly 13.

As best seen in FIG. 3, the frame assembly 13 comprises two parallel L-beams 22a and 22b with two welded cross support Z-beams 23a and 23b. The L-beams 22a and 22b are cut to a length and spaced apart so that the frame assembly 13 may be easily bolted to the two chassis channels of a standard truck 11. It is understood that when fabricating the frame assembly 13, the length and spacings of the L-beams 22a and 22b depend upon the length and spacings of the two chassis channels used by various truck manufacturers. When the frame assembly 13 is fixed to the chassis of the truck 11, it defines a longitudinal direction having a front and rear along the truck length corresponding to the truck's front and rear, with a side to side transverse direction.

At the rear of the frame 13 the inclined guide channel means 14 is welded. The guide channel means 14 has longitudinally spaced apart forward and rear segments 24a and 24b, respectively. The forward segment 24a of the guide channel means 14 comprises two short and beveled I-beam pieces 25a and 25b welded to the uppermost portion of the rearmost cross support Z-beam 23b with two I-beam pieces 26a and 26b welded to the shorter pieces 25a and 25b respectively so as to define two transversely opposed and inclined channels 27a and 27b terminating in short and essentially horizontal channels at the upper ends thereof. The rear segment 24b of the guide channel means 14 comprises two I-beam pieces 30a and 30b welded to a secondary L-beam cross support bar 31 which in turn is welded transversely across the rear portion of the frame assembly 13. These two I-beam pieces are beveled at their welded ends so as to angle downward and also define two transversely opposed and inclined channels 32a and 32b. The I-beam pieces 26a, 26b, 30a and 30b are inclined such that the two rearmost I-beam pieces 30a and 30b define the two transversely opposed channels 32a and 32b so that they are upwardly inclined more closely to the vertical than the two transversely opposed channels 27a and 27b that are formed by the forward I-beam pieces 26a and 26b (FIG. 5).

The foot assembly 15 includes a longitudinally extending beam 34 having a forward and rear end 34a and 34b respectively, and an upwardly extending support beam 35 having two side pieces 35a and 35b welded to the outside of the longitudinal beam 34. Roller means 33, positioned at two spaced apart locations along the length of the support beam 35, permits the support beam 35 to slidably move upward along the guide channel means 14. The roller means 33 comprise two pair of steel rollers 33a and 33b positioned on the support beam 35. The first pair of rollers 33a is positioned at the top part on either side of the support beam 35 and operatively engages the two transversely opposed channels 27a and 27b of the forward segment 24a of the guide channel means 14. The other pair of rollers 33b is positioned approximately midway along either side of the length of the support beam 35 and operatively engages the two transversely opposed channels 32a and 32b of the rear segment 24b of the guide channel means 14 (FIG. 5). Thus, when the drive means 21, a conventional hydraulic cylinder, pushes the support beam 35 upwards along the guide channel means 14, the lift angle of the entire foot assembly 15 changes (FIG. 6) since the transversely opposed channels 32a and 32b of the rear segment 24b of the guide channel means 14 are upwardly inclined more closely to the vertical than the opposed channels 27a and 27b of the forward segment 24a of the guide channel means 14. When the foot assembly 15 is raised upward from its lowered position, the longitudinal beam 34 changes its lift angle from a normal horizontal position to an angle where its rear end 34b having the wheel engaging means 20 will be at a higher elevation than the longitudinal arm's front end 34a. Thus, when a vehicle to be towed is lifted, there is little danger that the longitudinal beam 34 will hit and damage a low lying bumper since the inclination of the lift places the bumper well above the beam 34. Even if the tires are low of air or have no air at all, which would cause the bumper to lie even closer to the center of the wheel base, i.e. closer to the ground, the inclination of the entire foot assembly 15 allows enough clearance between a vehicle bumper and the longitudinal beam 34 that there is little chance the vehicle's bumper would be damaged during towing.

Mounted to the rear end 34b of longitudinal beam 34 is the wheel engaging means 20 which is adapted to engage either the front or rear wheels of a vehicle to be towed. The wheel engaging means 20 includes a longitudinal arm 36 which is adapted to slide within the longitudinal beam 34 at its rearmost end 34b. An appropriate drive means 40 comprising a conventional hydraulic cylinder is positioned within both the longitudinal beam 34 and the longitudinal arm 36 and secured by appropriate pins 41 so that the longitudinal arm 36 may be selectively telescoped with respect to the longitudinal beam 34 of the foot assembly 15. A cross arm 42 is pivotally mounted to the longitudinal arm 36 for pivotal movement about a vertical axis 42a (FIG. 4).

Secured at opposite ends of the cross arm 42 are wheel engaging members 43. The wheel engaging members comprise a receiver 44, an outer lift arm 45, and an inner lift arm 46. The receivers 44 are of beveled construction so that they may be pushed well under the tires of a vehicle. Each receiver 44 has an open end which permits the receiver 44 to slidably engage the end of the cross arm 42 through an appropriate guide bar 47. A suitable T-bolt 50 locks the receiver 44 at select locations on the cross arm 42. The outer lift arm 45 slidably engages the receiver 44 so as to extend parallel to the arm 42, and the lift arm 45 includes a transverse hollow channel 45a mounted at the outer end thereof. The inner lift arm 46 is slidably supported in the channel 45a of the outer lift arm 45, and is parallel to the outer lift arm 45. The inner lift arm 46 is locked into a desired position in the channel 45a by a suitable set screw 51. When the receivers 44 are placed firmly against the tires of a vehicle to be towed, the channel 45a will firmly embrace the side of the tire positioned against the receiver 44 and the inner lift arm 46 engages the tire side opposite that side positioned against the receiver 44 (FIG. 8). Thus, the receivers 44, channel 45a, and inner lift arm 46 assure that the wheels of a vehicle which is to be towed do not slide away from the receiver 44 when the entire foot assembly 15 is raised. When the vehicle wheels are thus supported, a strap S is secured around the tire and tightened by a ratchet 52 (FIG. 3).

Once the vehicle's wheels are secured to the wheel engaging member 43, the support beam 35 is pushed upward along the guide channel means 14 by the pushing action of the hydraulic cylinder 21. The hydraulic cylinder 21 used for selectively moving the foot assembly 15 along the guide channel means 14 and between the lowered and raised positions is connected between the frame assembly 13 and the foot assembly 15. In the illustrated embodiment best seen in FIGS. 3 and 5, the base section of the hydraulic cylinder 21 is secured to the deck 16 by an appropriate pin and bracket arrangement 53. It is understood that the hydraulic cylinder 21 may be secured to either an elongated frame assembly 13 or the deck 16. The telescoping end of the hydraulic cylinder 21 is secured between the top part of the two side pieces 35a and 35b of the support beam 35. All workings of the hydraulic cylinders 21 and 40 and the crane and sling 12 are operated from a control panel C positioned on the side of the deck 16.

During a typical towing operation, the tow truck is driven to the scene of a vehicle disablement or accident. If the vehicle should be located off the road or at an askew angle on the road, the crane and sling 12 is used to pull the vehicle out from the ditch or straighten the vehicle onto the road. Once the vehicle is somewhat straight on the road, an operator lowers the foot assembly 15 to a nearly horizontal position relative to the ground by retracting the hydraulic cylinder 21 and lowering the foot assembly 15. The operator then adjusts and locks the receivers 44 on the cross arm 42 so that the distance between the two receivers 44 on either end of the cross arm 42 is equal to the wheel base width of the vehicle to be towed. Once the receivers 44 are adjusted and locked, the longitudinal arm 36 is telescoped outwardly so that the receivers 44 contact the edges of either the front or rear tires. It is obvious that since the cross arm 42 swivels about the vertical axis 42a, it is not necessary that the tow truck be oriented in a direct line with the disabled vehicle in order that the receivers 44 on the cross arm 42 line up with the disabled vehicle's tires. Thus, should the tow truck and the disabled vehicle be at a slight askew angle to each other, the cross arm 42 may be swiveled so as to orient the receivers 44 in a parallel line with an axis of the tires. Then, when an operator extends the cross arm 42 and attached receivers 44, both receivers 44 move against the disabled vehicle's tires. The tires are secured via the lift arms 45 and 46 and the strap and ratchet 52.

When the disabled vehicle's tires are firmly secured, the operator commences to lift the vehicle and draw the vehicle inward by extending the hydraulic cylinder 21 so as to push the support beam 35 upwardly along the guide channel means 14, and by retracting the hydraulic cylinder 40 in order to draw the longitudinal arm 36 inward. As the vehicle is progressively raised, the angle of lift also progressively changes to allow enough clearance between the disabled vehicle's bumper B and the longitudinal beam 34 or partially telescoped longitudinal arm 36. When the hydraulic cylinder 21 has extended to its limit, the rollers 33a positioned on the upper part of the support beam 35 have been pushed to the horizontal portion of the forward segment 24a of the guide channel means 21 (FIG. 6). This horizontal portion, formed from the two shorter I-beam pieces 25a and 25b, acts to direct onto those short I-beams, 25a and 25b, a large percentage of the downward forces created by the towed vehicle acting on the foot assembly 15. Thus, the likelihood that the sheer weight of a towed vehicle will weaken the hydraulic cylinder 21 and force the foot assembly 15 back down the guide channel means 14 is minimized.

It will be understood that the specification and examples are illustrative but not limiting of the present invention, and that other embodiments within the spirit and scope of the invention will suggest themselves to those skilled in the art.

That which is claimed is:

1. A vehicle towing apparatus comprising
   a frame assembly adapted to be mounted to a truck chassis and so as to define a longitudinal direction along the truck length and a side to side transverse direction, said frame assembly including guide channel means having longitudinally spaced apart forward and rear segments, with said rear segment being upwardly inclined more closely to the vertical than is said forward segment when viewed in side elevation,
   a foot assembly including a longitudinally extending beam having a forward end and a rear end, an upwardly extending support beam fixed to said longitudinal beam, and wheel engaging means mounted at said rear end of said longitudinal beam for engaging either the front or rear wheels of a vehicle to be towed,
   roller means mounted at two spaced apart locations along the length of said support beam of said foot assembly for slidably mounting said foot assembly to said guide channel means and for slidable movement between a lowered position wherein said longitudinal beam is generally horizontal, and a raised position wherein said longitudinal beam is inclined with respect to the horizontal and said rear end is above said forward end,
   drive means connected between said frame assembly and said foot assembly for selectively moving said foot assembly along said guide channel means and between said lowered and raised positions, whereby said wheel engaging means is adapted to engage the front or rear wheels of a vehicle to be towed while said foot assembly is in its lowered position, and said foot assembly may be moved to its raised position to lift either the front or rear wheels and thus one end of the vehicle.

2. A vehicle towing apparatus as defined in claim 1 wherein said guide channel means comprises horizontally aligned channels which oppose each other in the transverse direction.

3. The vehicle towing apparatus as defined in claim 2 wherein said forward segment of said guide channel means comprises a first pair of transversely opposed channels, and said rear segment comprises a second pair of transversely opposed channels.

4. The vehicle towing apparatus as defined in claim 3 wherein said opposed channels of said forward segment are separate from said opposed channels of said rear segment and wherein the opposed channels of each of said forward and rear segments are linear when viewed in side elevation.

5. The vehicle towing apparatus as defined in claim 4 wherein said roller means includes a first pair of rollers operatively engaging said opposed channels of said forward segment, and a second pair of rollers operatively engaging said opposed channels of said rear segment.

6. The vehicle towing apparatus as defined in claim 5 wherein said first pair of transversely opposed channels each include an upper substantially horizontal portion, and such that said first pair of rollers is received in said horizontal portions in said raised position of said foot assembly.

7. The vehicle towing apparatus as defined in claim 1 wherein said wheel engaging means includes a longitudinal arm slidably mounted to said longitudinal beam of said foot assembly, and a cross arm pivotally mounted to said longitudinal arm for pivotal movement about a vertical axis, and wheel engaging members at opposite ends of said cross arm.

8. The vehicle towing apparatus as defined in claim 7 further comprising second drive means for selectively telescoping said longitudinal arm of said wheel engaging means with respect to said longitudinal beam of said foot assembly.

9. The vehicle towing apparatus as defined in claim 1 further comprising a substantially horizontal deck fixedly mounted to said frame assembly so as to overlie and protectively cover the same.

* * * * *